(12) United States Patent
Cheng

(10) Patent No.: US 12,253,889 B1
(45) Date of Patent: Mar. 18, 2025

(54) MOBILE PHONE AND TABLET PERSONAL COMPUTER PROTECTIVE CASING WITH STAND

(71) Applicant: Ganhua Cheng, Anhui (CN)

(72) Inventor: Ganhua Cheng, Anhui (CN)

( * ) Notice: Subject to any disclaimer, the term of this patent is extended or adjusted under 35 U.S.C. 154(b) by 0 days.

(21) Appl. No.: 18/897,227

(22) Filed: Sep. 26, 2024

(30) Foreign Application Priority Data

Dec. 20, 2023 (CN) .......................... 202323497069.3

(51) Int. Cl.
*G06F 1/16* (2006.01)

(52) U.S. Cl.
CPC ................................... *G06F 1/166* (2013.01)

(58) Field of Classification Search
CPC ........ A45C 2011/002; A45C 2011/003; F16M 11/041; G06F 1/166
See application file for complete search history.

(56) References Cited

U.S. PATENT DOCUMENTS

| 2011/0036965 A1* | 2/2011 | Zhang | F16M 11/10 248/688 |
| 2020/0214408 A1* | 7/2020 | Shin | H04M 1/04 |

\* cited by examiner

*Primary Examiner* — James Wu
(74) *Attorney, Agent, or Firm* — Daniel M. Cohn; Howard M. Cohn

(57) ABSTRACT

A mobile phone and tablet personal computer protective casing with a stand, including a protective casing, a bottom support, a surface support, a supporting plate, a supporting groove, a connecting component, a switch hole and a switch part; the protective casing being provided with a through hole, the bottom support and the surface support; the supporting groove being formed in the surface support; the supporting plate being connected in the supporting groove; the switch hole being formed in the surface support and internally provided with the switch part; the switch part including a pressing member and a spring; and the pressing member being pressed to make the spring telescopic to drive the limitation of the limiting edge, thereby controlling the telescoping of the supporting plate. The problem that the supporting plate and other parts are easily damaged due to non-mechanized telescopic reset of the supporting plate is solved.

10 Claims, 4 Drawing Sheets

MOBILE PHONE AND TABLET PERSONAL COMPUTER PROTECTIVE CASING WITH STAND

TECHNICAL FIELD

The utility model relates to the technical field of accessories for mobile phones and tablet personal computers, in particular to a mobile phone and tablet personal computer protective casing with a stand.

BACKGROUND

With the development of society and the progress of science and technology, electronic products as related products working based on electric energy have brought great convenience to the daily life and work of people. Mobile phones and tablet personal computers as common electronic products have been widely used in the life of people. In order to protect them, it is usually necessary to equip with protective casings for them.

At present, the protective casings on the market are mainly aimed at protecting bodies of mobile phones and tablet personal computers and have been developed to be relatively mature in the art, but the simple protective casings for protecting the bodies can no longer satisfy demands of users, especially for two major products, i.e., mobile phones and tablet personal computers. They cannot be used in hand of the users for a long time, sometimes, they need to be placed on a plane such as a desktop for use, then the traditional protective casings cannot satisfy this demand. Although there are some stainless steel strips additionally mounted as stands or external fixed stands on the market to satisfy such a demand, they are not intelligent or mechanized enough and are inconvenient to carry, and they include some lift-pull clamping and limiting supporting plates. The supporting plates are often pulled to be damaged or laborious on European and American markets due to an excessive lifting force caused by overlarge hands of the users. Therefore, it is urgent to develop an intelligent and mechanized protective casing with a stand (a supporting plate) to solve above problems.

SUMMARY

The object of the utility model is to provide a mobile phone and tablet personal computer protective casing with a stand to overcome defects in the prior art, thereby solving the problem that a supporting plate or a stand of the existing mobile phone and tablet personal computer protective casing with the stand is not mechanized or intelligent in telescoping and is overstressed to be easily damaged. Most of existing protective casings with stands are of lift-pull types so as to be incapable of solving the above problems.

The utility model provides a mobile phone and tablet personal computer protective casing with a stand, including a protective casing, a bottom support, a surface support, a supporting plate, a supporting groove, a connecting component, a switch hole and a switch part;

the protective casing being provided with a through hole in the middle, the bottom support on the lower end and the surface support matched with the bottom support on the upper end;

the supporting groove being formed in the middle of the surface support;

the supporting plate being connected in the supporting groove through the connecting component;

the switch hole being formed in the surface support, and the switch part being disposed in the switch hole;

the switch part including a pressing member and a spring; and a circular hole groove being formed in the bottom of the pressing member, a side close to the supporting plate being a limiting edge, the spring being vertically disposed in the circular hole groove, and the pressing member being pressed to make the spring telescopic to drive the limitation of the limiting edge on the connecting component so as to control the telescoping of the supporting plate.

Further, the spring component includes a first connecting shaft, a second connecting shaft, a torque spring, a supporting column and a third connecting shaft, the supporting groove is provided with a symmetric groove in one end and a symmetric clamping groove in the other end, one end of the supporting plate is clamped in the symmetric groove through the first connecting shaft, the middle of the supporting plate is connected to one end of the supporting column through the second connecting shaft connected with the torque spring, and the other end of the supporting column is clamped in the symmetric clamping groove through the third connecting shaft.

Further, an elastic convex column is at least disposed in a bottom extension edge of the surface support.

Further, a spring limiting groove symmetric to the bottom of the pressing member is formed in an end, facing the bottom of the surface support, of the bottom support.

Further, the limiting edge is a trapezoidal limiting edge.

Further, an elliptical hole groove is formed in the bottom of the pressing member, and the spring is transversely placed in the elliptical hole groove.

The utility model has the following beneficial effects:

1. by at least disposing the elastic convex column in the bottom extension edge of the surface support, when the surface support and the bottom support can be better clamped in the through hole of the protective casing, high steadiness and fitness are achieved, and the problem of non-directional shaking cannot occur during rotational use, so that user experience for the product is better, and the degrees of mechanization and intelligence of the product are higher; and due to the processing for details, the quality of the product can be better improved; and 2. by disposing the switch part, the spring is vertically placed in the circular hole groove or is horizontally placed in the elliptical hole groove by means of two forms of the circular hole groove and the elliptical hole groove formed in the bottom of the pressing member and a specific shape of the limiting edge located on the side close to the supporting plate, and then, the pressing member is pressed or pushed to make the spring telescopic to drive the limitation of the limiting edge on the first connecting shaft in the connecting component, so that the torque spring in the connecting component connected to the supporting plate is out of limitation to be inertially telescopic, thereby driving the supporting plate to intelligently and mechanically retract into the supporting groove. The whole process is very simple and clear in operation and is time-saving and laborsaving, and the situation that the supporting plate and the parts thereof are easily damaged due to long-term overload cannot be caused at all by the mechanized and intelligent operation.

BRIEF DESCRIPTION OF THE DRAWINGS

In order to describe the technical solutions in the embodiments of the utility model or the prior art more clearly, the accompanying drawings required for describing the embodiments will be briefly described below. Apparently, the accompanying drawings in the following description show only some embodiments of the utility model, and those of ordinary skill in the art may still derive other accompanying drawings from these accompanying drawings without creative efforts.

Figure 1:
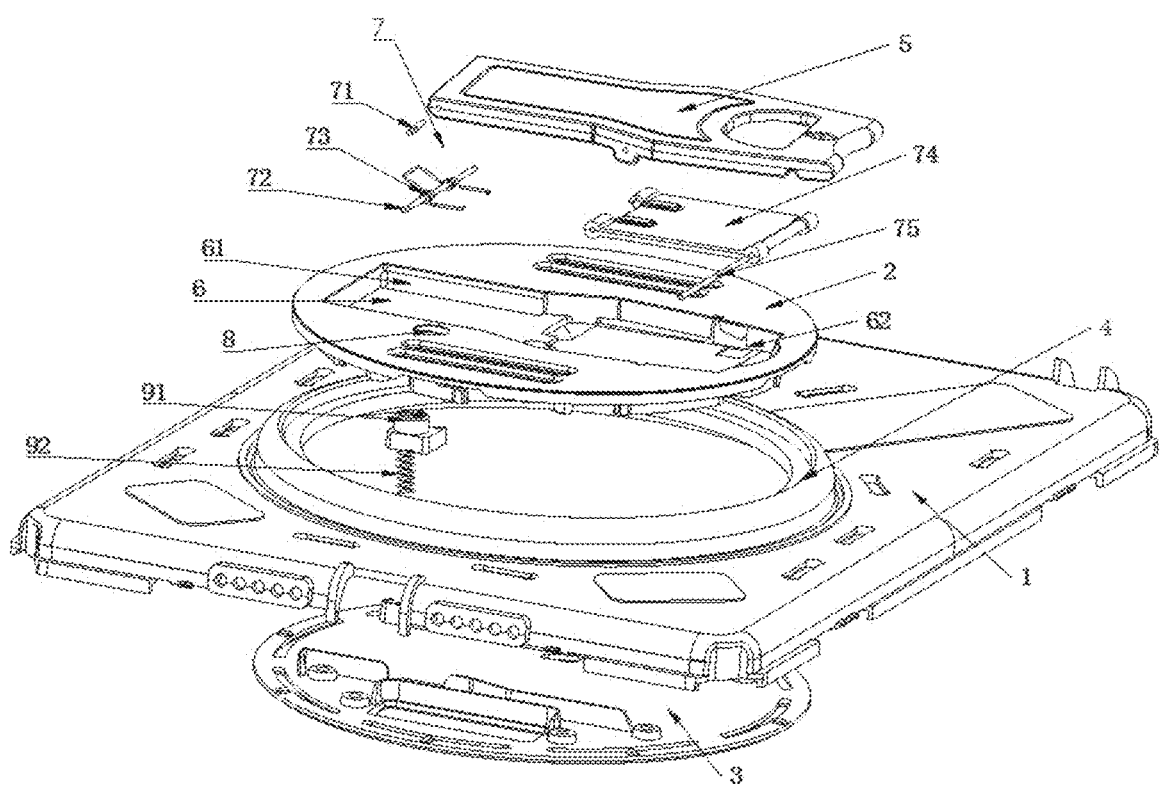
FIG. 1 is an overall schematic diagram of a mobile phone and tablet personal computer protective casing with a stand in the utility model.

Description for the accompanying drawings: 1—protective casing; 2—surface support; 3—bottom support; 4—through hole; 5—supporting plate; 6—supporting groove; 61—symmetric groove; 62—symmetric clamping groove; 7—connecting component; 71—first connecting shaft; 72—second connecting shaft; 73—torque spring; 74—supporting column; 75—third connecting shaft; 8—switch hole; 9—switch part; 91—pressing member; 911—limiting edge; 9111—trapezoidal limiting edge; 912—circular hole groove; 913—elliptical hole groove; 92—spring; 10—elastic convex column; and 11—spring limiting groove.

DETAILED DESCRIPTION

It should be noted that the embodiments in the present application and features in the embodiments may be combined with each other without conflicts. The utility model will be described below in detail with reference to the accompanying drawings and in conjunction with the embodiments. It should be indicated that the following detailed description is exemplary and is intended to provide further description for the present application. Unless otherwise specified, all technical and scientific terms used herein have the same meanings as those commonly understood by those of ordinary skill in the art to which the present application belongs.

For facilitating description, relative terms of space such as "over", "above", "on the upper surface of" and "on" may be used herein to describe a spatial positional relationship of a device or feature and other devices or features shown in the figure. It should be understood that the relative terms of space are intended to include different directions in use or operation except a direction of the device described in the figure. For example, if the device in the figure is inverted, it is described as that devices located "above other devices or structures" or "on other devices or structures" will be positioned "below other devices or structures" or "under other devices or structures" later. Therefore, the exemplary term "above" may include two directions, i.e., "above" and "below". The device may also be positioned in other different ways (rotated for 90 DEG or located in other directions), and the relative description for space used herein is correspondingly explained.

Now, exemplary implementations of the present application will be described in detail with reference to the accompanying drawings. However, the exemplary implementations may be implemented in various different forms, and should not be explained to be only limited to the implementations described herein. It should be understood that the implementations are provided for making the disclosure of the present application thorough and complete and sufficiently transmitting the concept of the exemplary implementations to those of ordinary skill in the art. In the accompanying drawings, for clarity, thicknesses of a layer and an area are increased, the same device is denoted with the same reference numeral in the accompanying drawings, and therefore, description thereof will be omitted.

Figure 2:
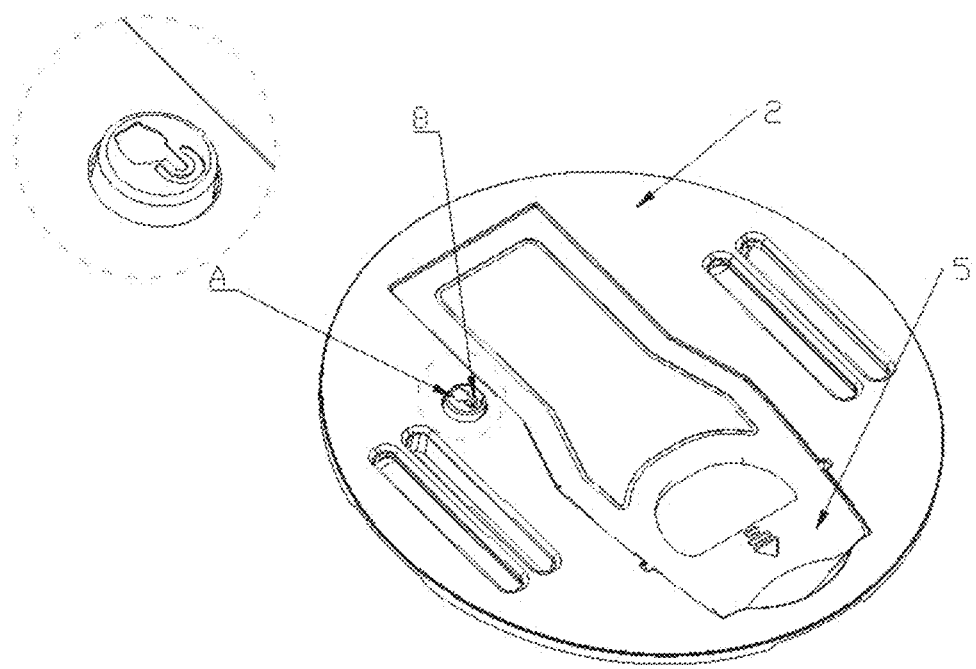
FIG. 2 is a schematic diagram of a structure that a supporting plate of the mobile phone and tablet personal computer protective casing with the stand retracts into a supporting groove in the utility model.
Figure 3:
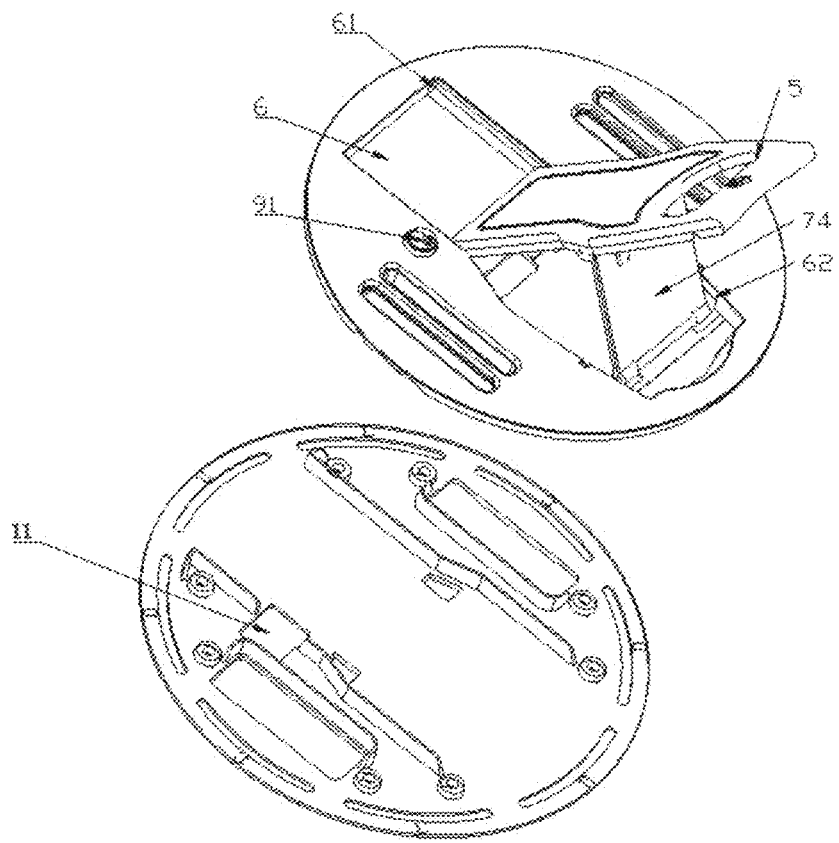
FIG. 3 is a schematic diagram shown when the supporting plate of the mobile phone and tablet personal computer protective casing with the stand extends out of the supporting groove in the utility model.
Figure 4:
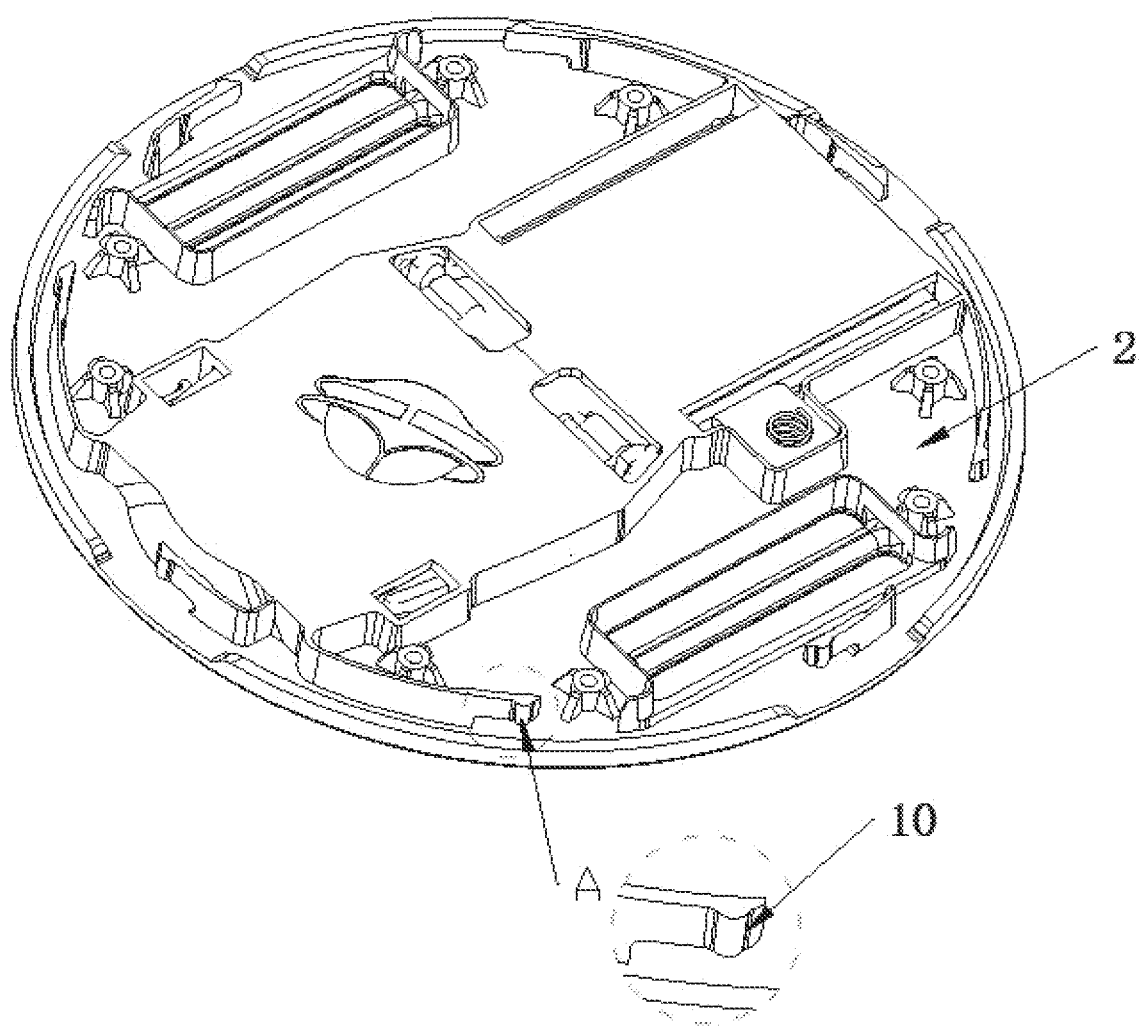
FIG. 4 is a schematic enlarged diagram of an elastic convex column of the mobile phone and tablet personal computer protective casing with the stand in the utility model.
Figure 5:
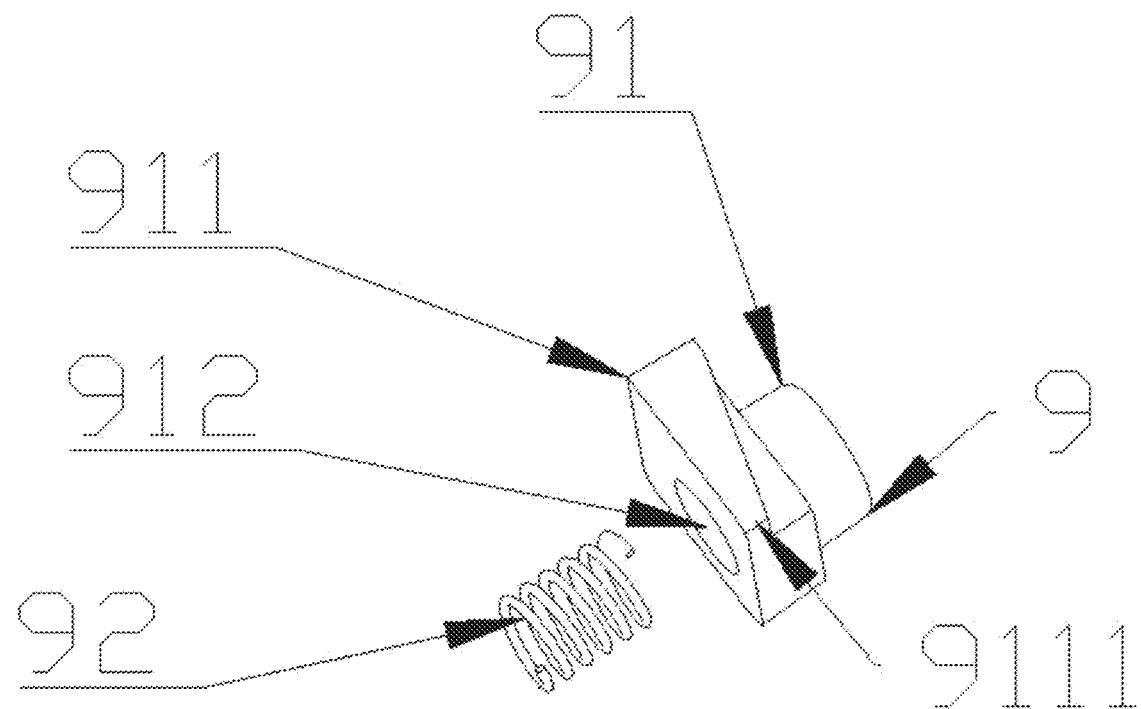
FIG. 5 is a schematic diagram of a pressing member of a circular hole groove of the mobile phone and tablet personal computer protective casing with the stand in the utility model.
Figure 6:
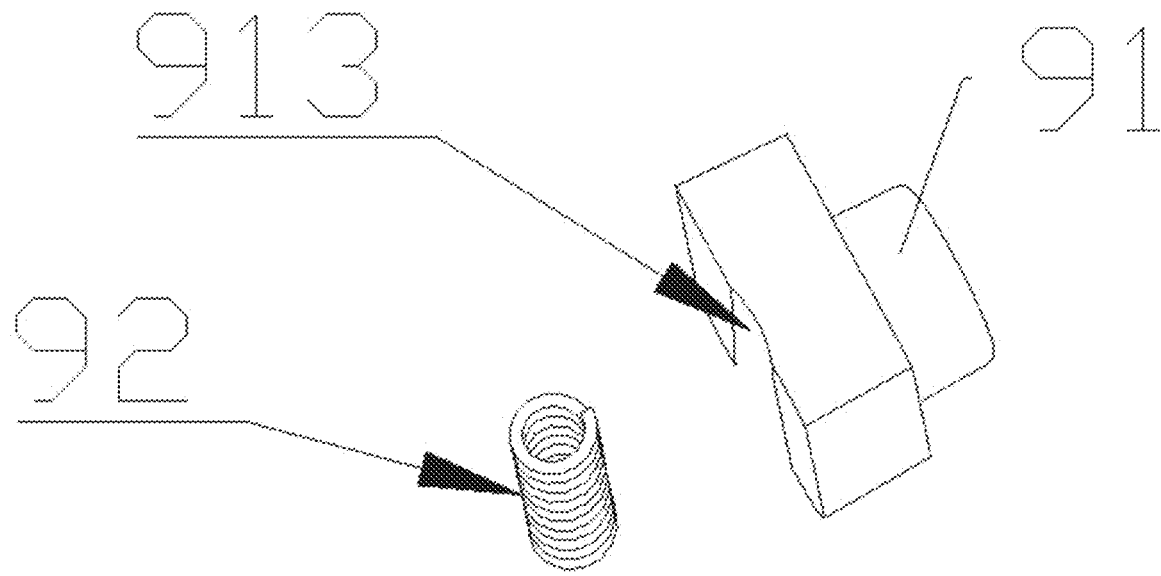
FIG. 6 is a schematic diagram of an elliptical hole groove of the mobile phone and tablet personal computer protective casing with the stand in the utility model.

Refer to FIG. 1 to FIG. 6, an embodiment of the utility model provides a mobile phone and tablet personal computer protective casing with a stand, including a protective casing, a bottom support, a surface support, a supporting plate, a supporting groove, a connecting component, a switch hole and a switch part;

wherein the protective casing is provided with a through hole in the middle, the bottom support on the lower end and the surface support matched with the bottom support on the upper end; the size and shape of the through hole are consistent with those of the surface support and the bottom support, the surface support and the bottom support may be fixedly connected by using nuts when being clamped with each other so as not to easily fall off, which may be easily known from the accompanying drawings; and when the bottom support and the surface support are clamped, the surface support is rotatable.

The supporting groove is formed in the middle of the surface support, which is for the purpose of matching with the supporting plate so that the supporting plate can be normally carried and is more beautiful when being in an unused state, and which is also for the purpose of matching for disposing the connecting component.

The supporting plate is connected in the supporting groove through the connecting component so that the supporting plate can achieve more intelligent and mechanized operation.

The switch hole is formed in the surface support, and the mountable switch part is disposed in the switch hole, a pressing member therein protrudes out of the switch hole, and thus, a user can operate the pressing member more conveniently and simply.

The switch part includes a pressing member and a spring, and a circular hole groove is formed in the bottom of the pressing member, which is a first form of the pressing member; a side close to the supporting plate is a limiting edge, the trapezoidal limiting edge can better make the first connecting shaft slide towards a force when the supporting plate is stressed to be pulled in a symmetric groove, and then, the first connecting shaft slides to be parallel to the trapezoidal limiting edge when reaching the highest point of the limiting edge, so that the first connecting shaft is parallel to the limiting edge so as to be clamped and limited when a reset force is generated by the supporting plate under the reset inertia of a torque spring to act on the first connecting shaft, and then, the supporting plate naturally stretches out of the supporting groove to enter an operation state. Due to a form of the circular hole groove, the spring may be vertically placed in the circular hole groove, then, the other end of the spring is placed in a spring limiting groove, matched with the pressing member, in the bottom support, after used by a user, the pressing member (see FIG. 2) exposed out of the switch hole only needs to be lightly pressed, so that the spring is telescopic to drive the limiting edge to descend at the same time; then the first connecting shaft is no longer parallel at the highest point of the limiting edge and may return to the symmetric groove under the effect of a reset force of the torque spring in the connecting component, and at the same time, the supporting plate is driven to retract into the supporting groove. The whole process is very simple and clear and is convenient to operate; and due to the intelligent and mechanized operation, it is unnecessary for the user to waste great power, or the problem that the supporting plate and remaining parts are accelerated to be damaged due to violent operation caused by the user who does not know how to retract the supporting plate into the supporting groove is solved.

Preferably, the spring component includes a first connecting shaft, a second connecting shaft, a torque spring, a supporting column and a third connecting shaft, the supporting groove is provided with a symmetric groove in one end and a symmetric clamping groove in the other end, one end of the supporting plate is clamped in the symmetric groove through the first connecting shaft, the middle of the supporting plate is connected to one end of the supporting column through the second connecting shaft connected with the torque spring, and the other end of the supporting column is clamped in the symmetric clamping groove through the third connecting shaft. By means of such an intelligent connecting component and the matched operation between the symmetric groove and the symmetric clamping groove respectively formed in two ends of the supporting groove, the operation of the switch part and the supporting plate is better linked, and more scientific and intelligent connection operation is achieved.

Preferably, an elastic convex column is at least disposed in a bottom extension edge of the surface support, by which when the surface support and the bottom support can be better clamped in the through hole of the protective casing, high steadiness and fitness are achieved, and the problem of non-directional shaking cannot occur during rotational use, so that user experience for the product is better, and the degrees of mechanization and intelligence of the product are higher; and due to the processing for details, the quality of the product can be better improved.

Preferably, a spring limiting groove symmetric to the bottom of the pressing member is formed in an end, facing the bottom of the surface support, of the bottom support, by which the stability of the pressing member can better matched, and at the same time the operation stability of the spring can be ensured, so that higher intelligence and high-precision mechanization are achieved.

Preferably, the limiting edge is a trapezoidal limiting edge which is a preferred limiting edge, for the first purpose of better limiting the first connecting shaft and the second purpose of better providing a slope to ensure that the supporting plate can better reach a limited position when extending out of the supporting groove; in addition, the limiting edge may also be designed to be any shape with a bevel edge of the slope, such as a right-angled triangle.

Preferably, an elliptical hole groove is formed in the bottom of the pressing member, and the spring is transversely placed in the elliptical hole groove, which is a second form of the pressing member. Such a form is changed only for the purpose of better providing a way that a user provides an external force to make the first connecting shaft out of limitation from the limiting edge of the pressing member. The pressing member in such a form gives a force by pushing the pressing member to one side, and at the same time, the spring is stressed in the same way, so that the limiting edge and the first connecting shaft are staggered so as to be no longer in contact; and meanwhile, the supporting plate is mechanically reset into the supporting groove under the action of the reset force of the torque spring.

It can be known from above embodiments that the utility model is used.

It should be noted that terms used herein are only intended to describe specific implementations, rather than to limit the exemplary implementations of the present application. As used herein, a singular form is also intended to include a plural form unless it is explicitly indicated in the context otherwise. In addition, it should be further understood that, when terms "include" and/or "comprise" are used in this description, it is indicated that there are features, steps, operations, devices, components and/or combinations thereof.

It should be noted that terms such as "first" and "second" in the description and claims of the present application and the above-mentioned accompanying drawings are used for distinguishing similar objects, but are unnecessarily used for describing a specific sequential or chronological order. It should be understood that data used in such a way are interchangeable under appropriate circumstances, such that the implementations of the present application described herein can be implemented in other sequences than illustrated or described herein.

Above descriptions are only preferred embodiments of the utility model, and are not intended to limit the utility model. Any alterations and variations may be made on the utility model by the skilled in the art. Any modifications, equivalent substitutions, improvements, etc. made within the spirit and principle of the utility model shall fall within the protection scope of the utility model.

What is claimed is:

1. A mobile phone and tablet personal computer protective casing with a stand, comprising:
  a protective casing, a bottom support, a surface support, a supporting plate, a supporting groove, a connecting component, a switch hole and a switch part;
  wherein the protective casing being provided with a through hole in the middle, the bottom support on the lower end and the surface support matched with the bottom support on the upper end;
  the supporting groove being formed in the middle of the surface support;
  the supporting plate being connected in the supporting groove through the connecting component;
  the switch hole being formed in the surface support, and the switch part being disposed in the switch hole;
  the switch part comprising a pressing member and a spring; and
  a circular hole groove being formed in the bottom of the pressing member, a side close to the supporting plate being a limiting edge, the spring being vertically disposed in the circular hole groove, and the pressing member being pressed to make the spring telescopic to drive the limitation of the limiting edge on the connecting component so as to control the rotation of the supporting plate.

2. The mobile phone and tablet personal computer protective casing with the stand of claim 1, wherein the connecting component comprises a first connecting shaft, a second connecting shaft, a torque spring, a supporting column and a third connecting shaft, the supporting groove is provided with a symmetric groove in one end and a symmetric clamping groove in the other end, one end of the supporting plate is clamped in the symmetric groove through the first connecting shaft, the middle of the supporting plate is connected to one end of the supporting column through the second connecting shaft connected with the torque spring, and the other end of the supporting column is clamped in the symmetric clamping groove through the third connecting shaft.

3. The mobile phone and tablet personal computer protective casing with the stand of claim 2, wherein an elliptical hole groove is formed in the bottom of the pressing member, and the spring is transversely placed in the elliptical hole groove.

4. The mobile phone and tablet personal computer protective casing with the stand of claim 1, wherein an elastic convex column is at least disposed in a bottom extension edge of the surface support.

5. The mobile phone and tablet personal computer protective casing with the stand of claim 4, wherein an elliptical hole groove is formed in the bottom of the pressing member, and the spring is transversely placed in the elliptical hole groove.

6. The mobile phone and tablet personal computer protective casing with the stand of claim 1, wherein a spring limiting groove symmetric to the bottom of the pressing member is formed in an end, facing the bottom of the surface support, of the bottom support.

7. The mobile phone and tablet personal computer protective casing with the stand of claim 6, wherein an elliptical hole groove is formed in the bottom of the pressing member, and the spring is transversely placed in the elliptical hole groove.

8. The mobile phone and tablet personal computer protective casing with the stand of claim 1, wherein the limiting edge is a trapezoidal limiting edge.

9. The mobile phone and tablet personal computer protective casing with the stand of claim 8, wherein an elliptical hole groove is formed in the bottom of the pressing member, and the spring is transversely placed in the elliptical hole groove.

10. The mobile phone and tablet personal computer protective casing with the stand of claim 1, wherein an elliptical hole groove is formed in the bottom of the pressing member, and the spring is transversely placed in the elliptical hole groove.

* * * * *